Patented Dec. 17, 1940

2,225,284

UNITED STATES PATENT OFFICE 2,225,284

ORAL PROPHYLACTIC

William M. McDonald, Oakville, Ontario, Canada

No Drawing. Application February 1, 1936, Serial No. 61,893. Renewed February 21, 1940. In Canada February 9, 1935

2 Claims. (Cl. 167—93)

This invention relates to a composition of matter intended particularly for use in the treatment of mouth conditions such as gingivitis, pyorrhoea and trench mouth, and my object is to produce a preparation which will by capillary action penetrate between the gums and the teeth and carry oxygen liberating and germicidal reagents where such are needed. A further object is to provide a preparation in which the release of oxygen is so controlled that its evolution in the presence of diseased tissue is gradual.

I attain my objects by combining an oxidizing agent such as sodium perborate, a substantially non-oxidizable oil and particularly a medicinal grade of petroleum oil, and a harmless reagent adapted to increase the surface tension of the suspension, such as "auramine" (British Drug Houses Ltd.) having the graphic formula

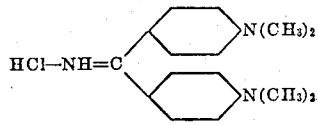

The "auramine" also adds to the efficacy of the mixture since it is active as a germicide, protozoacide and amoebacide. The oil used is preferably of a viscosity no greater than that of the petroleum oil put on the market under the trade name of "Nujol" and preferably somewhat less. Viscosities between 10 to 30 S. A. E. have been found satisfactory. The test is the ability of the paste to creep by capillary action between the gums and teeth while the oil remains in proper admixture with the solid ingredients. Petroleum jellies do not produce the desired results. While the best results are obtained by using mineral oil, fatty animal and vegetable oils may be used provided they are or may be made substantially free from objectionable taste and odor and are substantially non-oxidizable in the presence of the oxidizing agent.

An innocuous food color is also preferably employed such as "National Sitro Yellow" (National Aniline Co.) and also a flavoring material such as oil of peppermint. In addition to coloring the product, "Sitro Yellow" acts as a stabilizing reagent.

The preferred proportions are as follows:

| | | |
|---|---|---|
| Oil | fluid ozs | 110 |
| Sodium perborate | lbs | 10 |
| Sitro yellow | gram | ½ |
| Auramine | $\frac{1}{2500}$-$\frac{1}{5000}$ part by weight of the above total | |
| Glycerine | Enough to dissolve the auramine | |

The proportions given are not critical and may be more or less varied, more particularly the coloring and flavoring. The quantity of "auramine" which can be dispersed in the mixture depends on the fineness of the perborate, and with finely ground perborate up to $\frac{1}{2500}$ part by weight of auramine may be introduced into the mixture. The use of a quantity of auramine greater than $\frac{1}{2500}$ part is objectionable since it would tend to separate out and also to stain the gums. The use of a quantity of "auramine" less than $\frac{1}{5000}$ part results in greatly decreased efficiency.

In making the preparation I first grind the perborate to the required degree of fineness, then mix the perborate with the coloring material, then add the oil and mix to a paste. The "auramine" dissolved in glycerine is then incorporated. The flavoring may be added at any stage of the process.

For the "auramine" other synthetic dyestuffs having germicidal and protozoacidal and/or amoebacidal qualities may be substituted, particularly those of the diphenylmethane series to which "auramine" belongs provided they fulfil the most important function of the "auramine," which is what it increases the surface tension of the oil used and thus markedly increases the penetration of the mixture into the capillary fissures or channels through which deep seated infection must be reached.

For the perborate may be used other chemicals that are oxidizing agents in solid form, such as magnesium peroxide.

It is important that a part at least of the perborate should be of near colloidal fineness to give it the greatest possible penetration under capillary attraction. It is preferable that the greater part of the perborate shall be no larger than bacterial size, say $\frac{1}{10,000}$" in diameter in order that the perborate may be drawn by capillary pull wherever bacteria are to be found. By grinding a part at least of the oxygen-liberating compound to substantially bacterial fineness not only is there ensured ready penetration of the compound into capillary spaces but also an important additional advantage obtains in that settling and creeping is prevented. In this connection, it has been found that when ordinary perborate powder is used with oil the mixture tends to settle, the oil remaining at the top and the perborate settling into a hard cake at the bottom. Not only does the product tend to become unusable but the oil at the top will creep to an extent which makes it most difficult to package in marketable form.

Another result of the very fine grinding is that a greatly increased surface of solid is obtained on which the "auramine" is adsorbed. It is found that it is advantageous to drive off part of the water of crystallization from the perborate which is effected by heating the perborate, preferably before mixing, to a temperature at or about 120° C. a sufficient length of time to drive off about two-thirds of the water of crystallization. If heating is effected in vacuo the temperature may be lowered, so also other methods of dehydrating may be employed as will be understood by chemists with knowledge of the art.

The effect of this treatment is to further slow up the liberation of oxygen when the composition is used, thus spreading, in time, its remedial effect.

It is thought that the treatment results in the formation of borates having a different number of molecules of water of crystallization and which give up oxygen at different rates.

It is thus possible to obtain different results by removing more or less of the water of crystallization and by mixing together batches of perborate from which different proportions of the water of crystallization have been removed.

In use it is found that the composition remains homogeneous in its consistency throughout the mass and that when applied to the gums or adjacent tissues the oxidizing agent and the "auramine" are carried by capillary action to the affected parts with marked remedial effect due to the gradual release of oxygen and the direct action of the "auramine."

The combination of the oil and oxidizing agent without "auramine" gives an oral prophylactic of high oxidizing properties and considerable powers of penetration but is not nearly as effective as when a suitable harmless reagent is employed to raise the surface tension of the suspension.

It will be obvious that a prophylactic such as described may be useful in many cases where it is desired to carry oxygen releasing reagents into capillary spaces for prophylactic purposes.

What I claim as my invention is:

1. An oral prophylactic comprising a mixture of an inorganic oxidizing agent in solid form, selected from the group comprising sodium perborate and magnesium peroxide; a substantially non-oxidizable oil; and a harmless reagent of the diphenyl-methane dyestuff series having the property of increasing the surface tension of the oil to increase its capillary penetration, which reagent has the formula

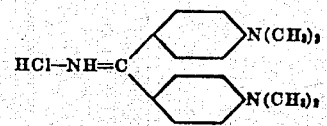

2. An oral prophylactic comprising a mixture of an inorganic oxidizing agent in solid form, selected from the group comprising sodium perborate and magnesium peroxide; a substantially non-oxidizable oil; and a harmless reagent of the diphenyl-methane dyestuff series having the property of increasing the surface tension of the oil to increase its capillary penetration, which reagent has the formula

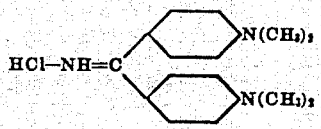

and part at least of the oxidizing agent being of substantially colloidal fineness.

WILLIAM M. McDONALD.